(12) United States Patent
Rhodes et al.

(10) Patent No.: US 11,067,048 B2
(45) Date of Patent: Jul. 20, 2021

(54) VEHICLE DEVICE MANAGEMENT

(71) Applicant: Ford Global Technologies, LLC, Dearborn, MI (US)

(72) Inventors: Kevin Rhodes, Dearborn, MI (US); Pallav Sohoni, Farmington Hills, MI (US); Chad Bednar, Royal Oak, MI (US); Erik Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 662 days.

(21) Appl. No.: 15/808,596

(22) Filed: Nov. 9, 2017

(65) Prior Publication Data

US 2019/0136815 A1    May 9, 2019

(51) Int. Cl.
| | |
|---|---|
| *F02N 11/08* | (2006.01) |
| *H04W 4/02* | (2018.01) |
| *B60R 25/24* | (2013.01) |
| *H04W 4/80* | (2018.01) |
| *H04L 29/08* | (2006.01) |
| *H04W 4/44* | (2018.01) |

(52) U.S. Cl.
CPC .......... *F02N 11/0807* (2013.01); *B60R 25/24* (2013.01); *H04L 67/12* (2013.01); *H04W 4/02* (2013.01); *H04W 4/023* (2013.01); *B60R 2325/101* (2013.01); *H04W 4/44* (2018.02); *H04W 4/80* (2018.02)

(58) Field of Classification Search
CPC ............ B60R 2325/00; B60R 2325/10; B60R 2325/101; B60R 25/00; B60R 25/20; B60R 25/24; F02N 11/00; F02N 11/08; F02N 11/0803; F02N 11/0807; F02N 11/10; F02N 11/101; F02N 2200/00; F02N 2200/12; F02N 2200/123; F02N 2300/00; F02N 2300/30; F02N 2300/302; F02N 2300/306; H04L 67/00; H04L 67/12; H04L 67/18; H04W 4/00; H04W 4/008; H04W 4/02; H04W 4/023; H04W 4/30
See application file for complete search history.

(56) References Cited

U.S. PATENT DOCUMENTS

| | | | |
|---|---|---|---|
| 2015/0161834 A1* | 6/2015 | Spahl | H04W 4/021 340/5.61 |
| 2016/0241698 A1 | 8/2016 | Kim | |
| 2017/0048680 A1* | 2/2017 | Chuang | H04W 64/003 |
| 2017/0055108 A1 | 2/2017 | Jeon | |

* cited by examiner

*Primary Examiner* — Charles J Han
(74) *Attorney, Agent, or Firm* — Michael Spenner; Brooks Kushman P.C.

(57) ABSTRACT

Methods and systems for managing mobile devices for connection with a vehicle are provided. A processor is configured to determine whether a mobile device is within a predetermined distance of the vehicle based on a comparison between the first geographical data of the mobile device and second geographical data of the vehicle. Responsive to determining that the mobile device is within the predetermined distances of the vehicle based on the comparison, the processor is configured to enable Bluetooth functionality on the mobile device.

13 Claims, 3 Drawing Sheets

VEHICLE DEVICE MANAGEMENT

TECHNICAL FIELD

Aspects of the disclosure generally relate to managing devices for connection with a vehicle.

BACKGROUND

Vehicles and mobile phones often include Bluetooth technology for communicating with one another. This technology allows a driver to utilize a mobile phone in a hands-free manner while driving, such as by interacting with controls integrated with the vehicle. Mobile phones are usually configured such that Bluetooth functionality can be manually enabled and disabled. Although enabling Bluetooth functionality on a mobile phone allows connection with a vehicle, enabling Bluetooth also draws additional power from the mobile device's battery and necessitates more frequent charging of the mobile device as a result.

SUMMARY

In an exemplary embodiment, a system includes a processor configured to identify whether a mobile device is within a predetermined distance of a vehicle based on a comparison between first geographical data of the mobile device and second geographical data of the vehicle. Responsive to determining that the mobile device is within the predetermined distance of the vehicle based on the comparison, the processor is configured to enable Bluetooth functionality on the mobile device.

In another exemplary embodiment, a system includes a processor configured to identify whether a mobile device is within a predetermined distance of a vehicle and is moving towards the vehicle based on a comparison between first geographic data of the mobile device and second geographic data of the vehicle. Responsive to determining that the mobile device is within the predetermined distance of the vehicle and is moving towards the vehicle based on the comparison, the processor is configured to enable Bluetooth functionality on the mobile device.

In a further exemplary embodiment, a method includes identifying, by a processor, that a mobile device is within a predetermined distance of a vehicle based on a comparison between first geographical data of the mobile device and second geographical data of the vehicle. Responsive to identifying that the mobile device is within the predetermined distance of the vehicle based on the comparison, the method includes enabling, by the processor, Bluetooth functionality on the mobile device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
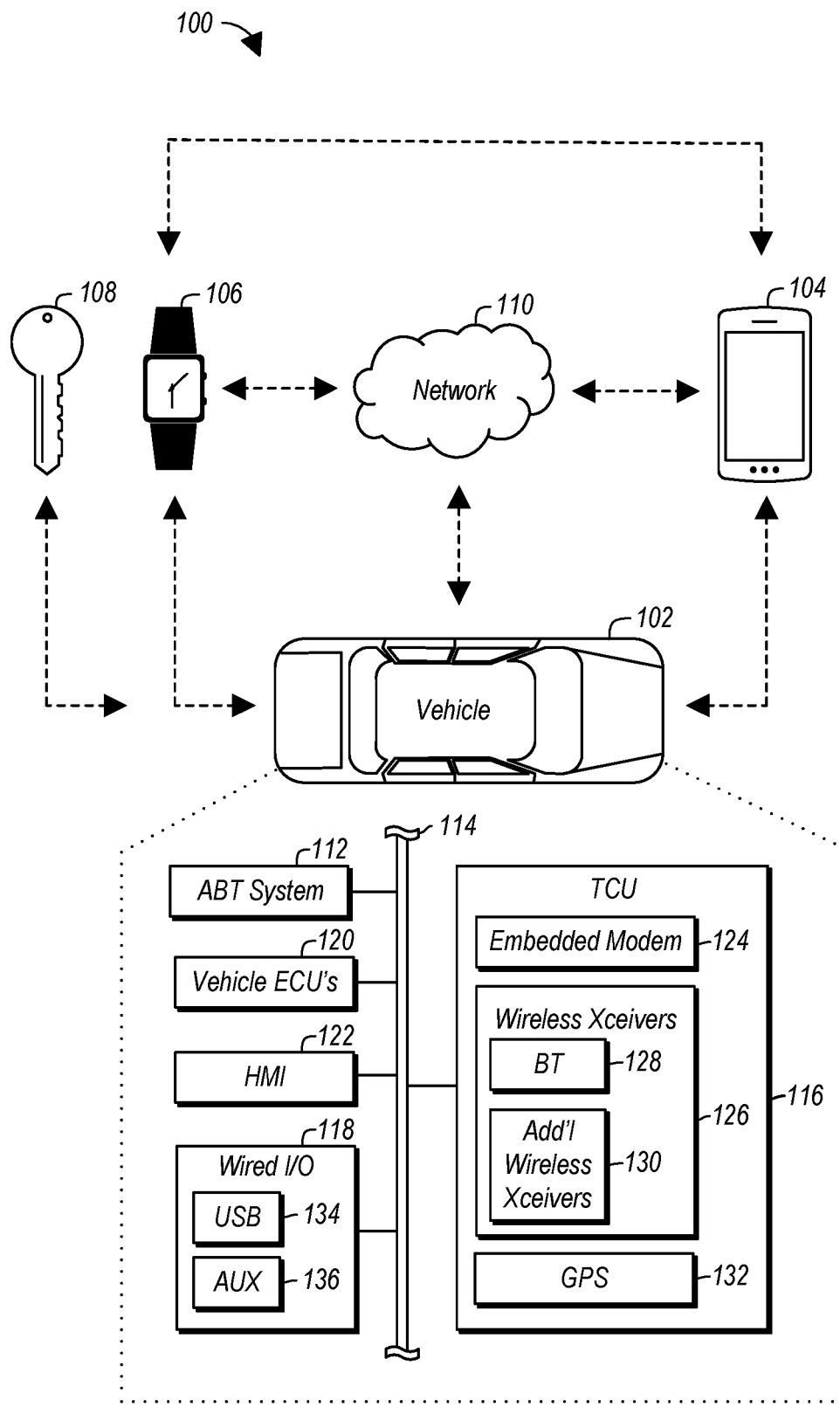
FIG. 1 illustrates an exemplary system for managing mobile devices for connection with a vehicle.

FIG. 1 provides an exemplary system 100 for managing mobile devices for connection with a vehicle. The system 100 may include a vehicle 102, a mobile device 104 such as a cellular phone, smart phone, tablet, and/or personal computer organizer, and a smart wearable 106 such as a smart watch and/or fitness tracker. Each of these system components may communicate with one or more of the other components over the network 110. The network 110 may include one or more interconnected communication networks, such as one or more of the Internet, a cable television distribution network, a satellite link network, a local area network, a wide area network, and a telephone network. Each of these system components may also directly communicate with one or more of the other components when in communication range thereof, such as via radio frequency ("RF") technology. The system 100 may also include a vehicle key 108 able to directly communicate with the vehicle 102 when in communication range thereof.

The vehicle 102 may be configured to provide several in-vehicle services, such as hands-free telephone service, via a Bluetooth connection established between the vehicle 102 and the mobile device 104. For instance, the vehicle 102 may include integrated controls for controlling the mobile device 104 over the Bluetooth connection without directly interacting therewith, and may include an integrated microphone and speakers for conducting telephone calls over the Bluetooth connection. As a further example, the vehicle 102 may retrieve audio files including music from the mobile device 104 over the Bluetooth connection, and may play such files over the vehicle 102 speakers.

The mobile device 104 may be configured to allow a user to manually disable a wireless functionality, such as Bluetooth functionality, when not in use. When disabled, the wireless transceiver supporting the wireless functionality is inactive and drawing little or no power from the mobile device 104. Accordingly, after leaving the vehicle 102, a user may disable Bluetooth functionality on his or her mobile device 104 to preserve battery power. However, the user may forget to enable Bluetooth functionality before again operating the vehicle 102, which may prevent the vehicle 102 from offering the in-vehicle services described above. As a result, the user may create a dangerous situation by attempting to interact with the mobile device 104, such as to answer a call or enable Bluetooth functionality, while the vehicle 102 is operating. Moreover, when the user ceases operating the vehicle 102, the user may forget to turn off Bluetooth functionality, which may unnecessarily drain the mobile device 104 battery. Hence, embodiments described herein relate to automatically enabling and disabling Bluetooth functionality on the mobile device 104 relative to the vehicle 102 without user interaction.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include thereon a unique identifier, such as a Vehicle Identification Number ("VIN").

The vehicle 102 may include an automatic Bluetooth trigger ("ABT") system 112 configured to perform functions in support of the processes described herein. Accordingly, the ABT system 112 may be configured to automatically enable and disable Bluetooth functionality on the mobile device 104 upon the occurrence of one or more events. For instance, in some embodiments, the ABT system 112 may be configured to identify whether the mobile device 104 is within a predetermined distance of the vehicle 102 based on a comparison between geographical data of the mobile device 104 and geographical data of the vehicle 102. Responsive to determining that the mobile device 104 is within the predetermined distance of the vehicle 102, the ABT system 112 may be configured to automatically enable Bluetooth functionality on the mobile device 104, such as by causing the vehicle 102 to send a corresponding signal over the network 110 to the mobile device 104. Additional examples are described below.

The ABT system 112 may be configured to communicate with other vehicle 102 components via one or more in-vehicle networks 114. The in-vehicle networks 114 may include one or more of a vehicle controller area network ("CAN"), an Ethernet network, and a media oriented system transfer ("MOST") network. The other vehicle 102 components may include one or more of a telematics control unit ("TCU") 116, wired input/output ("I/O") interfaces 118, various vehicle ECU's 120, and a human machine interface ("HMI") 122. Each of the vehicle 102 components may be implemented via hardware, software, or both.

The TCU 116 may provide one or more machine interfaces that operatively and wirelessly couple the vehicle 102 to other devices and systems, such as the other system 100 components and the network 110. The vehicle 102 components may wirelessly communicate with devices and systems remote from and/or not integrated with the vehicle 102 via the TCU 116.

The TCU 116 may include one or more embedded modems 124. Each embedded modem 124 may include one or more cellular modems configured to facilitate communication between the vehicle 102 and other system 100 components over the network 110. The cellular modems may be configured to connect with and communicate over the network 110 via one or more cellular networks to which the modems are subscribed. For instance, the network 110 may include the Internet, and the vehicle 102 may communicate with the other system 100 components over the Internet via a cellular modem connected to a cellular data network. As a further example, the network 110 may include a telephone network, and the vehicle 102 may communicate with the other system 100 components over the telephone network via a cellular modem wirelessly connected to a cellular voice network.

The TCU 116 may also include wireless transceivers 126. The wireless transceivers 126 may be configured to facilitate direct wireless communication between the vehicle 102 and other system 100 components that are local to (e.g., within wireless communication range of) the wireless transceivers 126 of the vehicle 102. A wireless transceiver 126 may be configured to directly connect and communicate with a corresponding wireless transceiver of another system 100 component. Various wireless transceivers 126 may have different communication ranges dependent on the wireless technology (e.g., Bluetooth, Wi-Fi) and features (e.g., remote unlock, passive entry, hands-free telephone service) implemented by the wireless transceiver 126. In some embodiments, a system 100 component may be within wireless communication range of the wireless transceivers 126 only when the wireless transceivers 126 receive a signal of at least a certain signal strength from the system 100 component, as indicated by received signal strength indication ("RSSI") measurements taken by the vehicle 102. Different wireless technologies and different wireless features may entail different minimum RSSI measurements, such as depending on how near the system 100 component needs to be to the vehicle 102 to be considered within communication range for a given wireless feature to be enabled. The stronger the RSSI measurements, the closer the mobile device 104 may be to the vehicle 102. Minimum RSSI measurements may be determined and stored in the vehicle 102 in advance.

The wireless transceivers 126 may communicate via RF transmissions. The wireless transceivers 126 may include a Bluetooth transceiver 128 and additional wireless transceivers 130, which may include one or more of a Wi-Fi transceiver, a radio-frequency identification ("RFID") transceiver, a near-field communication ("NFC") transceiver, a keyless entry transceiver, and a smart key transceiver, as some non-limiting examples.

The TCU 116 may further include a global positioning satellite ("GPS") module 132. The GPS module 132 may be configured to identify vehicle 102 geographical data, such as via communicating with satellites. The vehicle geographical data may include a current latitude and longitude of the vehicle 102, and may include a current address of the vehicle 102. The GPS module 132 may be configured to provide the geographical data to another vehicle 102 component, such as the ABT system 112, automatically or on request.

The wired I/O interfaces 118 may provide one or more machine interfaces that operatively couple the vehicle 102 to other devices and systems, such as the other system 100 components, that are local to (e.g., within wired range of) the vehicle 102. The other vehicle 102 components may thus communicate with other devices and systems that are remote from and/or not integrated with the vehicle 102 via the wired I/O interfaces 118. The wired I/O interfaces 118 may include a Universal Serial Bus ("USB") interface 134 and an auxiliary ("AUX") interface 136. The AUX interface 136 may be configured to receive audio from a connected device, such as a mobile device 104, for transmission over vehicle 102 speakers. The USB interface 134 may be configured for more complex communications. For example, the vehicle 102 may communicate with the mobile device 104 via the USB interface 134 to control the mobile device 104, to enable in-vehicle services (e.g., hands-free telephone, navigation, music, in-vehicle apps) facilitate by the mobile device 104, and/or to access the network 110 via the cellular or Wi-Fi Internet connection of the mobile device 104.

The vehicle ECU's 120 may be configured to monitor and manage various functions of the vehicle 102 under the power of the vehicle 102 battery and/or drivetrain. The vehicle ECU's 120 may include, but are not limited to, a powertrain controller configured to monitor and manage engine operating components, a body controller configured to monitor and manage various power control functions such as exterior lighting, interior lighting, keyless entry, remote start, and point of access status verification, a radio transceiver controller configured to communicate with key fobs, mobile devices, or other local vehicle 102 devices, an entertainment controller configured to support voice command and Bluetooth interfaces with the driver and driver carry-on devices, such as the mobile device 104, and a climate management controller configured to monitor and manage heating and cooling system components (e.g., compressor clutch, blower fan, temperature sensors, etc.).

The HMI 122 may facilitate occupant interaction with the vehicle 102, or more particularly, with the vehicle 102 components. The HMI 122 may receive input from and output information to a user. The HMI 122 may include input devices and controls such as a touch screen, an alphanumeric keyboard, a pointing device, keypads, push-buttons, control knobs, and microphones capable of accepting commands or input from the user to invoke functions of the vehicle 102 components. For example, the HMI 122 may include steering wheel audio buttons, a push-to-talk button, instrument panel controls, and the like. The HMI 122 may also include video or alphanumeric displays, a speaker, and any other suitable audio and visual indicators capable of providing data to the user. For example, the HMI 122 may include a head unit display included in a center console area of the vehicle 102 cabin and/or a screen of a gauge cluster of the vehicle 102.

While an exemplary system 100 is shown in FIG. 1, the example is not intended to be limiting. Indeed, the system 100 may have more or fewer components, and alternative components and/or implementations may be used. For instance, in addition or alternatively to communicating via the in-vehicle networks 114, two or more vehicle 102 components may be directly connected. As an example, a vehicle ECU 120 may be directly connected to one or more components of the TCU 116 to support the functions of the vehicle ECU 120 (e.g., each of the body controller, radio transceiver controller, and/or the entertainment controller may be directly connected to one or more of the wireless transceivers 126 to support the controllers' functions). As an additional example, one or more of the vehicle 102 components may be directly connected to the HMI 122 to enable user interaction with the vehicle 102 components.

Figure 2:
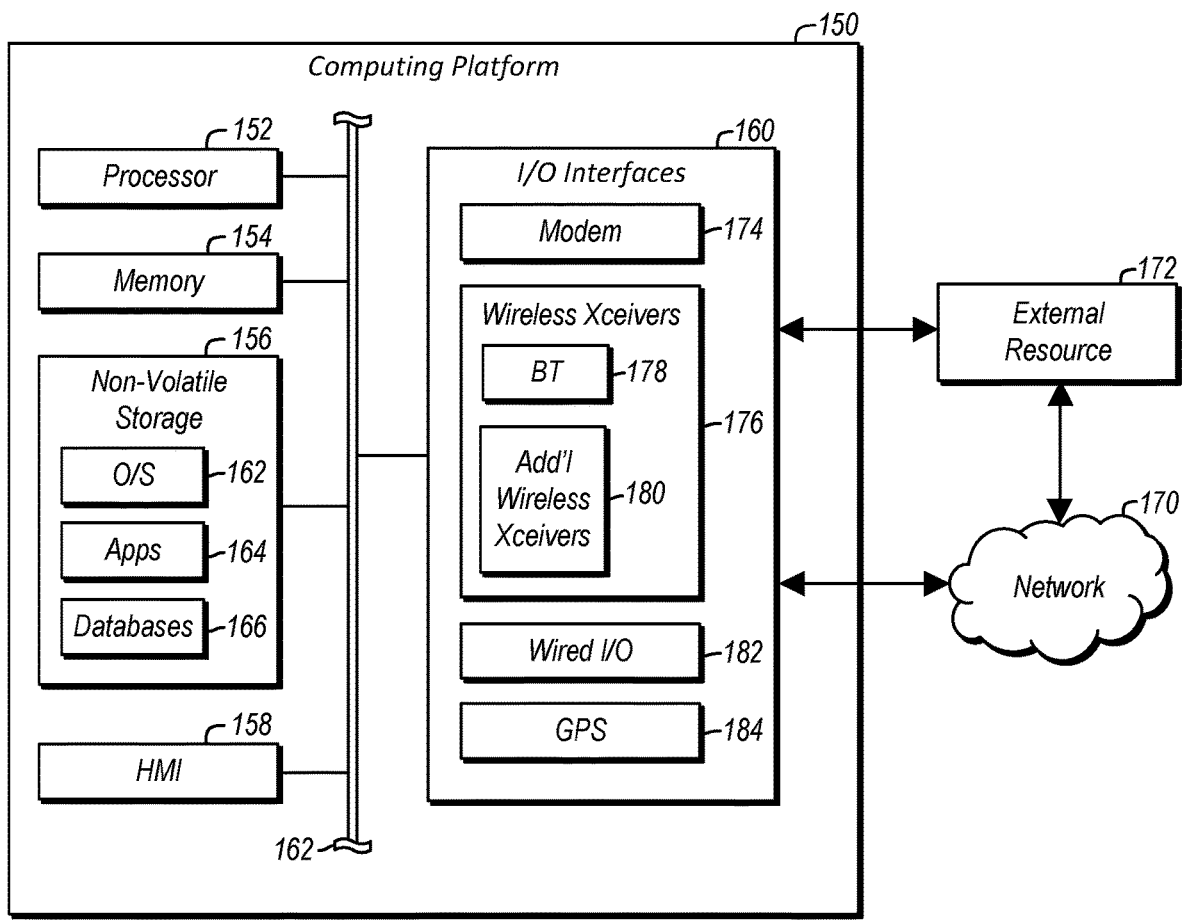
FIG. 2 illustrates an exemplary computing platform that may be utilized in the exemplary system of FIG. 1.

Referring to FIG. 2, the vehicle 102 may include, as part of the vehicle 102, one or more computing platforms 150 connected to the in-vehicle networks 114 for implementing the vehicle 102 components. The one or more computing platforms 150 of the vehicle 102 may be embedded in the vehicle 102 such that they are not readily detachable and/or removeable from the vehicle 102 each time the vehicle 102 is turned off (e.g., not a driver's mobile device 104 brought into the vehicle 102 cabin). Each vehicle 102 component described above may be implemented by a different computing platform 150 connected to the in-vehicle networks 114. Alternatively, two or more of the vehicle 102 components may share hardware, firmware, and software, such that a single computing platform 150 connected to the in-vehicle networks 114 includes the two or more vehicle 102 components. As a further example, one or more vehicle 102 components may be distributed across a same set of computing platforms 150. The mobile device 104, the smart wearable 106, and the vehicle key 108 may likewise each include one or more computing platforms 150 for implementing the functions thereof.

A given computing platform 150 of the system 100 may include one or more of a processor 152, memory 154, non-volatile storage 156, an HMI 158, and input/output ("I/O") interfaces 160 in communication over one or more computer buses 161. The processor 152 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 154. The memory 154 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 156 may include one or more persistent data storage devices such as a hard drive, optical drive, tape drive, non-volatile solid state device, or any other device capable of persistently storing information.

The processor 152 may operate under control of computer-executable instructions embodied as an operating system ("O/S") 162 residing in non-volatile storage 156 and read into memory 154. The O/S 162 may manage computer resources so that computer-executable instructions embodied as one or more software applications 164 residing in non-volatile storage 156 may be read into memory 154 and executed by the processor 152. Alternatively, the processor 152 may execute the applications 164 directly, in which case the O/S 162 may be omitted. The computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. Upon execution by the processor 152, the computer-executable instructions of the O/S 162 and the applications 164 may cause the processor 152 to perform the functions of the components (e.g., vehicle 102 components, system 100 components) described herein. For example, upon execution of the applications 164, the processor 152 may perform the functions of the ABT system 112, of the vehicle ECU's 120, of the mobile device 104, of the smart wearable 106, or of the vehicle key 108.

One or more databases 166 may reside on non-volatile storage 156, and may be used to collect and organize data used by the various systems and modules described herein. The databases 166 may include data and supporting data structures that store and organize the data. The databases 166 may be arranged with any database organization or structure including, but not limited to, a relational database, a hierarchical database, a network database, or combinations thereof. A database management system in the form of a computer software application executing as instructions on the processor 152 may be used to access the information or data stored in records of the databases 166 in response to a query, where a query may be dynamically determined and executed by the O/S 162, applications 164, or one or more modules.

The HMI 158 may be operatively coupled to the processor 152 of computing platform 150 in a known manner to allow a user to interact directly with the computing platform 150. The HMI 158 may include the HMI 122 (FIG. 1), or may include one or more components that are similar to one or more components of the HMI 122. For instance, the HMI 158 may include video or alphanumeric displays, a touch screen, a speaker, and any other suitable audio and visual indicators capable of providing data to the user. The HMI 158 may also include input devices and controls such as an alphanumeric keyboard, a pointing device, keypads, push-buttons, control knobs, microphones, etc., capable of accepting commands or input from the user and transmitting the entered input to the processor 152.

The I/O interfaces 160 may provide one or more machine interfaces that operatively couple the processor 152 to other devices and systems, such as the network 170 or one or more external resources 172. The network 170 may include the one or more in-vehicle networks 114 (FIG. 1), and may include the network 110 (FIG. 1). External resources 172 may include, but are not limited to, servers, databases, mass storage devices, peripheral devices, cloud-based network services, or any other suitable computer resources that may be used by the computing platform 150. For example, the external resources 172 may include a vehicle 102 component implemented by a different computing platform 150 or another system 100 component. The applications 164 may thus work cooperatively with the network 170 and the external resources 172 by communicating via the I/O interfaces 160 to provide the various components, features, functions, applications, processes, or modules comprising embodiments of the invention.

The I/O interfaces 160 may include a modem 174, which may include or be similar to the embedded modem 124 (FIG. 1). The modem 174 may thus be a cellular modem configured to connect to the network 170 over a cellular network. The I/O interfaces 160 may also include a GPS module 184. The GPS module 184 may include or be similar to the GPS module 132 (FIG. 1). The GPS module 184 may thus be configured to identify geographical data of the computing platform 150, such as via communication with satellites. The GPS module 184 may be configured to provide the geographical data to another computing platform 150 component, such as to the processor 152 for use by an executed application 164, automatically or on request.

The I/O interfaces 160 may further include wireless transceivers 176 and/or wired I/O interfaces 182. The vehicle 102 and the other system 100 components may include corresponding wireless transceivers 176 and/or wired I/O interfaces 182 that utilize like communication protocols to enable direct communication between the vehicle 102 and the other system 100 components. For instance, the wireless transceivers 176 may include one or more components of the vehicle 102 wireless transceivers 126 (FIG. 1), such as when the wireless transceivers 176 are of the vehicle 102, and may include one or more components that correspond to one or more components of the vehicle 102 wireless transceivers 126, such as when the wireless transceivers 176 are of another system 100 component. The wired I/O interfaces 182 may likewise include one or more components of the vehicle 102 wired I/O interfaces 118 (FIG. 1), and may include one or more components that correspond to one or more components of the vehicle 102 wired I/O interfaces 118.

The wireless transceivers 176 may include a Bluetooth transceiver 178, which may include or may correspond to the vehicle 102 Bluetooth transceiver 128 (FIG. 1), and may include additional wireless transceivers 180, which may include or may correspond to one or more of the vehicle 102 additional wireless transceivers 130 (FIG. 1). As an example of communication between system 100 components via the wireless transceivers 176, when the mobile device 104 Bluetooth transceiver 178 is enabled and within communication range of the vehicle 102 Bluetooth transceiver 128, the mobile device 104 Bluetooth transceiver 178 may form a connection with the vehicle 102 Bluetooth transceiver 128. This connection may allow a user to control and access the mobile device 104 via the vehicle 102 HMI 122, which may enable in-vehicle services such as hands-free telephone service, streaming music from the mobile device 104, navigation using data from the mobile device 104, and in-vehicle apps operating via data from the mobile device 104. In some embodiments, the vehicle 102 components may access the network 110 via the cellular or Internet connection of the mobile device 104 (e.g., via the modem 174 or Wi-Fi transceiver of the mobile device 104).

As a further example, when the mobile device 104, smart wearable 106, and/or vehicle key 108 come within communication range of a keyless entry or smart key transceiver of the vehicle 102, the corresponding additional wireless transceiver 180 of the nearby device may transmit a predetermined code to the vehicle 102, either automatically or upon user input (e.g., selection of a button on the device). If the transmitted code matches a code stored in the vehicle 102, such as in non-volatile storage 156 of one of the vehicle ECU's 120 (e.g., the body controller), the vehicle ECU 120 may be configured to unlock or start the vehicle, either automatically or upon additional user input (e.g., a push button start).

The wired I/O interfaces 182 may include or may correspond to one or more of the vehicle 102 wired I/O interfaces 118 (FIG. 1). Two or more of the system 100 components (e.g., the mobile device 104 and the vehicle 102) may thus include corresponding wired I/O interfaces 182 that use a same connection type to facilitate direct connection and communication between the system 100 components. The wired I/O interfaces 182 may include the vehicle 102 USB interface 134 (FIG. 1) or an interface corresponding to the vehicle 102 USB interface 134, and may include the vehicle 102 AUX interface 136 or an interface corresponding to the vehicle 102 AUX interface 136 (FIG. 1). The wired I/O interfaces 182 may also include one or more of an Ethernet interface, a CAN interface, and a MOST interface, such as for connecting and communicating over the in-vehicle networks 114.

Figure 3:
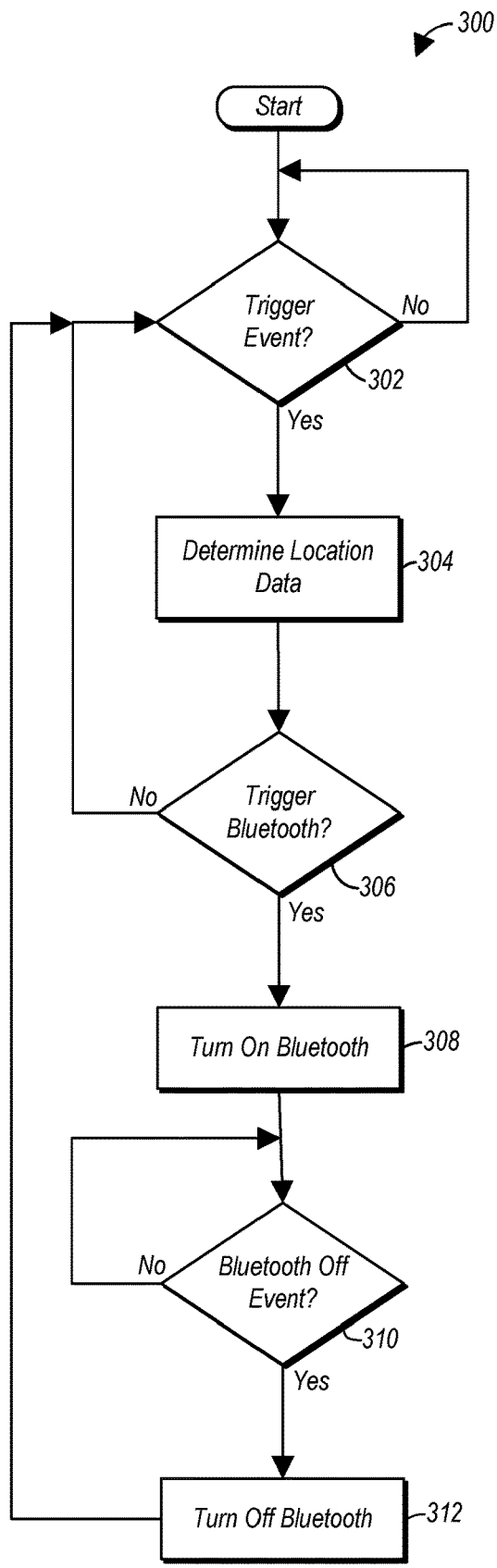
FIG. 3 illustrates an exemplary process for managing mobile devices for connection with a vehicle that may be performed by the exemplary system of FIG. 1.

FIG. 3 illustrates a process 300 for automatically enabling and disabling Bluetooth functionality on the mobile device 104. The process 300 may be performed by the exemplary system 100 of FIG. 1.

In block 302, a determination may be made of whether a trigger event has occurred. In general, a trigger event may be a predetermined event that, upon the event's occurrence, causes one of the vehicle 102, the mobile device 104, or the smart wearable 106 to either enable Bluetooth functionality on the mobile device 104, or to determine whether Bluetooth functionality on the mobile device 104 should be enabled. The system 100 may be configured to detect one or several different trigger events.

The trigger events may include various interactions with the vehicle 102, which may cause the vehicle ECU's 120 to transmit signals indicative of the events to the ABT system 112. For instance, the detectable trigger events may include when a vehicle 102 motor (e.g., internal combustion engine, electric motor) is turned on, which may cause the powertrain controller to transmit a corresponding signal to the ABT system 112 for event identification. The detectable trigger events may also include when a vehicle 102 door is opened, which may cause the body controller to transmit a corresponding signal to the ABT system 112 for event identification. The detectable trigger events may further include when the vehicle key 108 comes within communication range of the vehicle 102 wireless transceivers 126, such as the smart key transceiver of the vehicle 102, which may cause the vehicle 102 wireless transceivers 126 to form a local connection with the vehicle key 108 wireless transceivers 176, and may correspondingly cause the radio transceiver controller to transmit a signal to the ABT system 112 for event identification.

Responsive to identifying occurrence of a trigger event ("Yes" branch of block 302), location data may be determined in block 304, such as by the ABT system 112, to determine whether the mobile device 104 is within a predetermined distance of the vehicle 102. For example, a determination may be made of whether the mobile device 104 is within a predetermined distance of the vehicle 102 based on a comparison between location data for the mobile device 104 and location data for the vehicle 102. The location data may include geographical data, which may include an address or longitude and latitude values, that indicates where the vehicle 102 and/or mobile device 104 are located geographically.

For instance, the ABT system 112 may be configured to transmit a request for geographical data over the network 110 (e.g., over the Internet), such as via the vehicle 102 embedded modem 124, to the mobile device 104. Responsive to receiving the request, the mobile device 104 may be configured to determine its geographical data, such as by querying its GPS module 194 for GPS data of the mobile device 104, by performing cellular triangulation of the mobile device 104 modem 174, and/or by performing geolocation lookup of an IP address assigned to the mobile device 104. The mobile device 104 may then be configured to transmit the geographical data over the network 110 (e.g., over the Internet), such as via its modem 174, to the ABT system 112. The ABT system 112 may likewise be configured to determine vehicle 102 geographical data by querying its GPS module 132 for GPS data, by performing cellular triangulation relative to the vehicle 102 embedded modem 124, and/or by performing geolocation lookup of an IP address assigned to the vehicle 102.

In block 306, a determination may be made of whether Bluetooth functionality on the mobile device 104 should be triggered, such as by the ABT system 112, based on the determined location data. Specifically, the ABT system 112 may be configured to determine whether the location data indicates that the mobile device 104 is within a predetermined distance of the vehicle 102, such as by comparing the geographical data of the mobile device 104 and the geographical data of the vehicle 102. If not ("No" branch of block 306), then monitoring for another trigger event may follow, such as by the ABT system 112 (block 302).

Alternatively, if the mobile device 104 is determined to be within the predetermined distance of the vehicle 102 ("Yes" branch of block 306), then in block 308, Bluetooth functionality for the mobile device 104 may automatically be enabled, such as by the ABT system 112. For instance, the ABT system 112 may be configured to transmit a Bluetooth on signal to the mobile device 104, such as via the vehicle 102 embedded modem 124, over the network 110. Responsive to receiving the signal, the mobile device 104 may be configured to automatically enable its Bluetooth transceiver 178, which may allow the mobile device 104 and the vehicle 102 to form a local connection via the vehicle 102 Bluetooth transceiver 128 and the mobile device 104 Bluetooth transceiver 178 without a user interaction with the mobile device 104.

Additionally, or alternatively, determining the location data in block 304 may include identifying whether any of the mobile device 104 additional wireless transceivers 180 are within communication range of the vehicle 102 additional wireless transceivers 130. In block 306, the ABT system 112 may determine whether to trigger Bluetooth functionality on the mobile device 104 based on whether mobile device 104 additional wireless transceivers 180 were identified within communication range of the vehicle 102 additional wireless transceivers 130. If so ("Yes" branch of block 306), then the ABT system 112 may assume that the mobile device 104 is at least within a distance of the vehicle 102 that is equal to the communication range of the receiving vehicle 102 additional wireless transceiver 130, and may perform block 308, as described above, to turn on Bluetooth functionality of the mobile device 104. If not ("No" branch of block 306), then monitoring for another trigger event may follow, such as by the ABT system 112 (block 302).

Alternatively, in block 304, the ABT system 112 may be configured to perform RSSI measurements of communications received from the mobile device 104 additional wireless transceivers 180 by the vehicle 102 additional wireless transceivers 130 to determine whether the mobile device 104 additional wireless transceivers 180 are within a predetermined distance of the vehicle 102 additional wireless transceivers 130. The stronger the RSSI measurements, the closer the mobile device 104 may be determined as being to the vehicle 102. A correlation between RSSI measurements and distance, or a minimum RSSI measurement corresponding to the predetermined distance, may be determined and stored in the vehicle 102 in advance. In block 306, the ABT system 112 may determine whether to trigger Bluetooth functionality on the mobile device 104 by determining whether the mobile device 104 additional wireless transceivers 180 are within a predetermined distance of the vehicle 102 additional wireless transceivers 130 based on the RSSI measurements and the minimum RSSI or correlations stored in the vehicle 102. If so ("Yes" branch of block 306), then the ABT system 112 may perform block 308, as described above, to turn on Bluetooth functionality of the mobile device 104. If not ("No" branch of block 306), then monitoring for another trigger event may follow, such as by the ABT system 112 (block 302).

Referring again to block 302, the detectable trigger events may also include driving motions. For instance, the mobile device 104 and/or smart wearable 106 may be configured to determine whether the device is moving at a speed or accelerating faster than a predetermined threshold, such as by utilizing the device's GPS module 184, cellular triangulation via the device's modem 174, and/or an integrated accelerometer. Relative to the mobile device 104, responsive to detecting a driving motion ("Yes" branch of block 302), the mobile device 104 may be configured to automatically enable its Bluetooth functionality, such as by activating its Bluetooth transceiver 178, in block 308. In other words, blocks 304 and 306 may be omitted.

Relative to the smart wearable 106, responsive to detecting a driving motion ("Yes" branch of block 302), in block 304, the smart wearable 106 may be configured to determine location data in a manner similar to the ABT system 112 described above. For instance, the smart wearable 106 may be assumed to be in the vehicle 102, and may be configured to request and/or receive geographical data from the mobile device 104 via the smart wearable 106 modem 174 over the Internet or via the smart wearable 106 additional wireless transceivers 180 for comparison with its own geographical data. Because the smart wearable 106 may be assumed to be in the vehicle 102, comparing the smart wearable 106 geographic data with the mobile device 104 geographical data may be considered as comparing the vehicle 102 geographic data with the mobile device 104 geographical data. Additionally, or alternatively, the smart wearable 106 may identify whether the mobile device 104 is in communication range of the smart wearable 106 additional wireless transceivers 180, and may take RSSI measurements of signals received from the mobile device 104 at the smart wearable 106 additional wireless transceivers 180. In block 306, the smart wearable 106 may be configured to determine whether to trigger Bluetooth functionality on the mobile device 104 based on the determined location data, such as using the methods described above for the ABT system 112 (e.g., determining whether the location data indicates the mobile device 104 is within a predetermined distance of the smart wearable 106 and the vehicle 102).

If the mobile device 104 is determined to be within the predetermined distance of the smart wearable 106 ("Yes" branch of block 306), then in block 308, Bluetooth functionality for the mobile device 104 may automatically be activated, such as by the smart wearable 106. For instance, the smart wearable 106 may be configured transmit a Bluetooth on signal to the mobile device 104, such as via the smart wearable 106 modem 174 over the Internet or via the smart wearable 106 additional wireless transceivers 180. Responsive to receiving the signal, the mobile device 104 may be configured to automatically enable its Bluetooth transceiver 178, which may allow the mobile device 104 and the vehicle 102 to form a local connection via the vehicle 102 Bluetooth transceiver 128 and the mobile device 104 Bluetooth transceiver 178 without a user interaction with the mobile device 104.

Referring again to block 302, the trigger events may further include when the mobile device 104 comes within a predetermined distance of the vehicle 102. For instance, after a driver turns off and exits the vehicle 102, and/or after a predetermined time period, the ABT system 112 may be configured to periodically request and/or receive geographical data from the mobile device 104, such as via the embedded modem 124 and/or over the Internet, and compare this geographical data with the vehicle 102 geographical data to determine when the mobile device 104 is within the predetermined distance of the vehicle 102. Additionally, or alternatively, responsive to the mobile device 104 additional wireless transceivers 180 coming into communication range of the vehicle 102 additional wireless transceivers 130, the ABT system 112 may be configured to determine that the mobile device 104 is within the predetermined distance of the vehicle 102. Additionally, or alternatively, the ABT system 112 may be configured to utilize RSSI measurements of signals received from the mobile device 104 additional wireless transceivers 180 to determine when the mobile device 104 is within the predetermined distance of the vehicle 102. Additionally, or alternatively, the mobile device 104 may be configured to determine whether the device is within the predetermined distance of the vehicle 102 utilizing one or more methods similar to those outlined in this paragraph.

Responsive to determining that the mobile device 104 is within the predetermined distance of the vehicle 102 ("Yes" branch of block 302), Bluetooth functionality on the mobile device 104 may automatically be triggered in block 308, such as by the vehicle 102 as described above, or by the mobile device 104. In other words, blocks 304 and 306 may be omitted.

Alternatively, responsive to determining that the mobile device 104 is within the predetermined distance of the vehicle 102 ("Yes" branch of block 302), the mobile device 104 or the ABT system 112 may be configured to determine in block 306 whether the mobile device 104 is moving towards the vehicle 102 based on location data determined in block 304. If so, then in block 308, Bluetooth functionality on the mobile device 410 may be automatically triggered, as described above. For instance, in block 304, the mobile device 104 or ABT system 112 may be configured to continuously request and/or receive geographical data from the other device, such as over the Internet, and in block 306, the mobile device 104 or ABT system 112 may compare the geographical data from the other device with its geographical data to determine whether the mobile device 104 is moving towards the vehicle 102. Additionally, or alternatively, in block 304, the mobile device 104 or ABT system 112 may take RSSI measurements of signals received from the additional wireless transceivers 180 of the other device, and in block 306, the mobile device 104 or ABT system 112 may determine whether the mobile device 104 is moving towards the vehicle 102 based on identifying successively stronger RSSI measurements.

In block 310, the ABT system 112, the mobile device 104, and/or the smart wearable 106 may determine whether a Bluetooth off event has occurred. Detectable Bluetooth off events may include one or more predetermined user interactions with the vehicle 102. For instance, the ABT system 112 may be configured to identify occurrence of a Bluetooth off event when the vehicle 102 is turned off, when weight is removed from a vehicle 102 seat such as the driver's seat, when the vehicle 102 is locked after the vehicle 102 is turned off, and/or when the vehicle 102 door is opened after the vehicle 102 is turned off. Responsive to a Bluetooth off event ("Yes" branch of block 310), in block 312, Bluetooth functionality on the mobile device 104 may be disabled. For instance, the ABT system 112 may cause the vehicle 102 to send a Bluetooth off signal to the mobile device 104, such as via a component of the TCU 116, including the Bluetooth transceiver 128, that upon receipt by the mobile device 104, causes the mobile device 104 to automatically disable the mobile device 104 Bluetooth transceiver 178.

Additionally, or alternatively, in block 310, the ABT system 112 or the mobile device 104 may be configured to determine whether the mobile device 104 is at least a predetermined distance away and/or moving away from the vehicle 102. For instance, like the techniques described above, the ABT system 112 or the mobile device 104 may be configured to periodically request and/or receive geographical data from other component over the Internet or via the wireless transceivers 176, including the Bluetooth transceiver 178 of each of the vehicle 102 and the mobile device 104, and conduct a comparison of the geographical data to determine whether the mobile device 104 is at least the predetermined distance away and/or moving away from the vehicle 102. Additionally, or alternatively, the vehicle 102 or the mobile device 104 may be configured to determine whether the component's wireless transceivers 176 are no longer receiving signals from the wireless transceivers 176 of the the other component, or whether the component's wireless transceivers 176 are receiving signals from the wireless transceivers 176 of the other component that have an RSSI less than a predetermined value, to determine whether the mobile device 104 is at least the predetermined distance away and/or moving away from the vehicle 102. If yes ("Yes" branch of block 310), then in block 312, Bluetooth functionality on the mobile device 104 may be disabled. For instance, the ABT system 112 may cause the vehicle 102 to send a Bluetooth off signal to the mobile device 104, as described above, or the mobile device 104 may be configured to automatically initiate disabling of Bluetooth functionality itself.

Additionally, or alternatively, in block 310, the mobile device 104 and/or the smart wearable 106 may be configured to determine whether the device stops experiencing a driving motion for at least a predetermined time period. If so ("Yes" branch of block 310), then in block 312, Bluetooth functionality on the mobile device 104 may be disabled. For instance, the smart wearable 106 may send a signal to the mobile device 104, such as via a component of the smart wearable 106 I/O interfaces 160, including the Bluetooth transceiver 178, that upon receipt of the mobile device 104 causes the mobile device 104 to disable the mobile device 104 Bluetooth transceiver 178. Alternatively, the mobile device 104 may cause itself to disable Bluetooth functionality by causing itself to deactivate the mobile device 104 Bluetooth transceiver 178.

After block 312, the process 300 may return to block 302, in which monitoring for trigger events may be continued, such as by the ABT system 112, the mobile device 104, and/or the smart wearable 106.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a processor configured to,
responsive to periodically receiving, via a cellular network, a first geographical data indicative of a location of a mobile device, compare the first geographical data against a second geographical data indicative of a vehicle location,
responsive to detecting the mobile device is moving toward the vehicle and within a predetermined distance from the vehicle based on the first and second geographical data, send a Bluetooth activation signal, via the cellular network, to the mobile device, activating Bluetooth functionality on the mobile device, and
responsive to connecting with the mobile device via a Bluetooth link, unlock the vehicle.

2. The vehicle of claim 1, wherein the user interaction with the vehicle is turning on a motor of the vehicle.

3. The vehicle of claim 1, wherein the processor is further configured to,
identify a vehicle key within a communication range of the vehicle, and
request the first geographical data from the mobile device over the Internet.

4. The vehicle of claim 1, wherein the processor is further configured to
issue periodic geographical data requests to the mobile device over the cellular network, and
receive the first geographical data from the mobile device as a response to the periodic geographic data requests sent.

5. The vehicle of claim 1, wherein the first geographical data comprises first GPS data, and the second geographical data comprises second GPS data.

6. The vehicle of claim 1, wherein the processor is further configured to,
detect the vehicle is turned off after the Bluetooth functionality on the mobile device is activated, and
send a Bluetooth deactivation signal to the mobile device via Bluetooth to command the mobile device to deactivate Bluetooth functionality.

7. The vehicle of claim 1, wherein the processor is further configured to,
identify that the mobile device is at least a predetermined distance away from the vehicle based on a comparison between third geographical data of the mobile device and fourth geographical data of the vehicle each identified after the Bluetooth functionality on the mobile device is activated, and
deactivate Bluetooth functionality on the mobile device.

8. A system for a vehicle comprising:
a processor configured to,
responsive to receiving, via a cellular network, a first geographical data indicative of a location of a mobile device, compare the first geographical data against a second geographical data indicative of a vehicle location,
perform a received signal strength indication (RSSI) measurement of communications received from the mobile device,
identify that a mobile device is within a predetermined distance of a vehicle and is moving towards the vehicle based on the first and second geographical data and the RSSI measurement indicative of increasing signal strength, and
send a Bluetooth on signal to the mobile device via the cellular network, activating Bluetooth functionality on the mobile device.

9. The system of claim 8, wherein the processor is further configured to issue a plurality of periodic geographic data requests to the mobile device over the cellular network.

10. The system of claim 8, wherein the processor is further configured to,
detect the vehicle is turned off after the Bluetooth functionality on the mobile device is activated, and
send a Bluetooth deactivation signal to the mobile device via Bluetooth connection to deactivate Bluetooth functionality on the mobile device.

11. A method comprising:
by a processor,
detecting a user interaction with a vehicle,
comparing a first geographical data of a mobile device against a second geographical data of the vehicle, the first geographical data being periodically received over a cellular network;
identifying that a mobile device is within a predetermined distance of a vehicle and is moving toward the vehicle based on the comparison; and
activating Bluetooth functionality on the mobile device by sending a Bluetooth activation signal to the mobile device via the cellular network.

12. The method of claim 11, further comprising:
requesting, by the processor, the first geographical data from the mobile device over the cellular network in response to detecting the user interaction with the vehicle.

13. The method of claim 11, further comprising:
detecting the vehicle being turned off after the Bluetooth functionality on the mobile device is activated; and
deactivating Bluetooth functionality on the mobile device.

* * * * *